Sept. 14, 1937.  W. K. GRIEST  2,092,914
AUTOMOBILE SCREEN
Filed Nov. 6, 1936    2 Sheets-Sheet 1
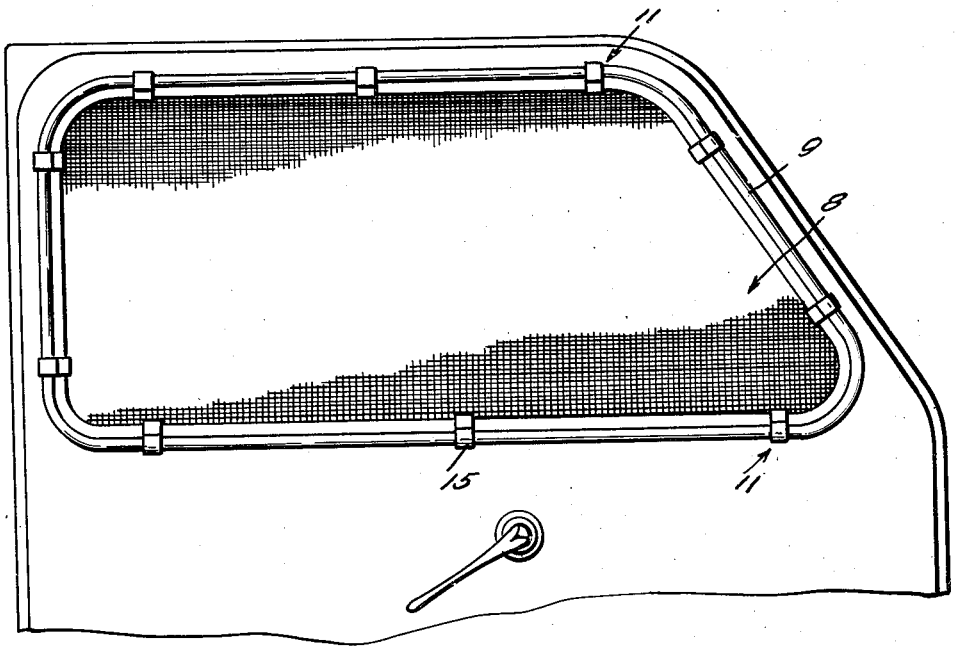
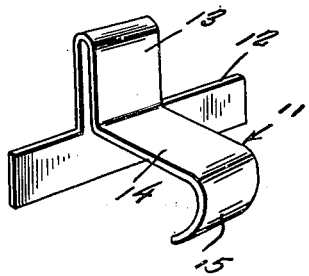
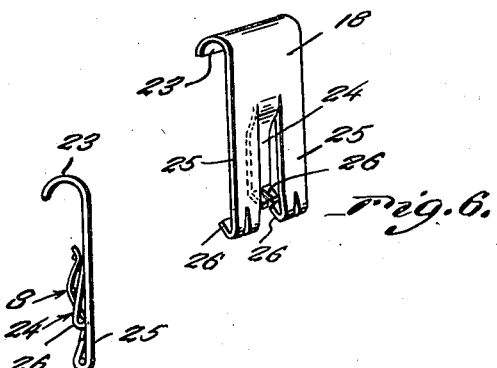
Inventor
W. K. Griest
By Clarence A. O'Brien
Hyman Berman
Attorneys Sept. 14, 1937.  W. K. GRIEST  2,092,914
AUTOMOBILE SCREEN
Filed Nov. 6, 1936  2 Sheets-Sheet 2

Inventor
W. K. Griest
By Clarence A. O'Brien
Hyman Berman
Attorneys

Patented Sept. 14, 1937

2,092,914

UNITED STATES PATENT OFFICE 2,092,914

AUTOMOBILE SCREEN

William K. Griest, Watertown, S. Dak.

Application November 6, 1936, Serial No. 109,590

4 Claims. (Cl. 156—14)

This invention relates to an improved automobile screen which is especially, but not necessarily, adapted for use in a car door window, its purpose being to provide adequate ventilation while at the same time effectively excluding the entrance of flying bugs, insects, and extraneous articles such as flying pebbles and the like.

Needless to say, I am sufficiently conversant with the general state of the prior art to which the invention relates to appreciate that detachable automobile screens, of many different varieties and types, have been patented and used. As a general proposition, however, the ordinary screen comprises a suitable mesh wire having a comparatively rigid marginal frame, the frame and screen being so made as to be installed in the sliding window grooves when the windows are open.

By way of structural contrast, the present invention is characterized essentially by a metal fabric screen having a flexible leather or equivalent marginal binder susceptible of accommodating a plurality of marginally spaced clips or fastenings capable of adequately holding the screen in the window opening in a position not to interfere with the sliding of the window glass.

In order to appreciate the outstanding feature of the invention, however, it is to be borne in mind that present-day pleasure type automobiles are made with irregularly-shaped window openings. Some of these are somewhat oval, while others are of substantially indescribable outlines. The purpose of the present invention is, therefore, to provide a pre-constructed flexible screen made to aptly fit the peculiarly shaped window opening, the individual attaching clips and flexibility of the marginal portion of the screen being such as to enable these features to utilize accumulative effects in enabling the screen to conform to the contour of the car door and window openings, this being necessary because some doors bulge outwardly, or are characterized by vertical and horizontal curvatures.

Stated otherwise, I have realized the problem of especially adapting screens to present-day irregularly shaped car door openings and have, therefore, set about to provide a flexible self-adapting easily applied and removed ventilating screen.

In reducing to practice the principles of the inventive conception I find it expedient and practicable to provide the flexible marginally bound screen and a plurality of varying types of clips or fasteners capable of adapting the screen to fit either in the molding close to the window glass, or to be hung from the inner marginal edge of the existing molding as the case may be.

Other features and advantages will become more readily apparent from the following description and drawings.

In the drawings, wherein like numerals are employed to designate like parts throughout the views:—

Figure 1 is what may be described as an inside elevational view of a present-day automobile door showing the irregularly-shaped screen and illustrating the manner in which it is installed and held in place.

Figure 3 is a perspective view of one of the types of clips or fasteners illustrated in Figure 2.

Figure 6 is a perspective view of the multiple claw-equipped hanger clip also shown at the top in Figure 4.

Figure 7 is an edge view of the clip seen in Figure 6 showing how the claws are inter-connected with the strands of wire forming the wire screen.

Figure 2:
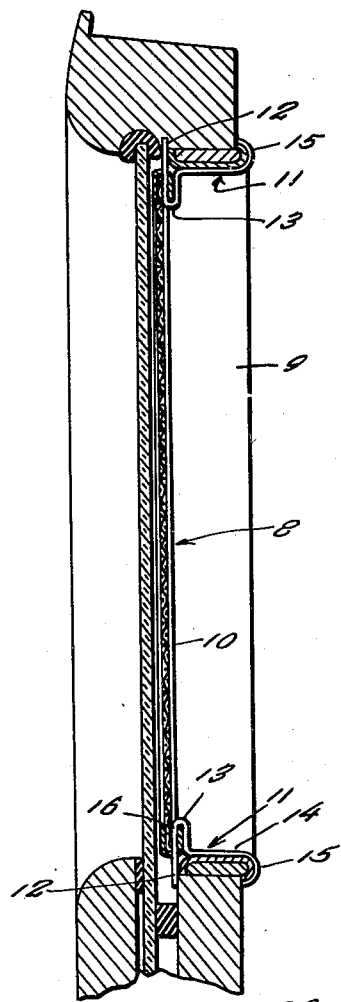
Figure 2 is a vertical sectional view showing the screen in position and the more-or-less standardized types of retaining clips employed to removably maintain it in place.

By way of introduction to the detailed description it is to be pointed out that the screen proper, denoted by the numeral 8, will obviously be of varying shapes. For example, the shape of the screen depicted in Figure 1 is of general rectangular form tapered at one end. In many present-day cars, however, there are oval-shaped window openings and openings of various outlines. In accordance with the principles of this invention the screen 8 will be cut and shaped to conform to the outline of the opening into which it is to be fitted. As a general proposition the screen will fit within the so-called molding 9 of the window opening as illustrated to advantage in Figures 2 and 4. In order to adopt it to this location the frame 10 will be flexible. As a general proposition the frame will be of leather or equivalent material. The purpose of this flexible screen is to allow it to conform to the contour of the car door or other part of the car with which it is associated. Some cars have bulging doors bowed horizontally as well as vertically into many streamlined shapes. Thus it is essential that the flexible framed screen 8 be adopted to conform to these irregular shapes. It is also desirable to utilize a plurality of marginally spaced adaptor clips to secure this flexible screen in the molding 9. The ordinary permanently attached type clip is denoted by the numeral 11 in Figure 3. This comprises a clip of somewhat T-shaped form. The head portion 12 is passed through a slit in the marginal frame of the screen so that it is retained in place. The U-shaped portion 13 serves to accommodate and fit over the complemental part of the screen frame. The shank 14 is disposed at right angles to the screen and reaches out so that the hooked free end 15 thereof may be engaged over the molding 9 as illustrated with requisite clearness in Figure 2. It follows, therefore, that in this arrangement I have a screen placed in the molding close to the window glass so as not to interfere with the sliding of the glass. It is maintained in place by the selectively placed quickly attachable and releasable clips 11.

Figure 4:
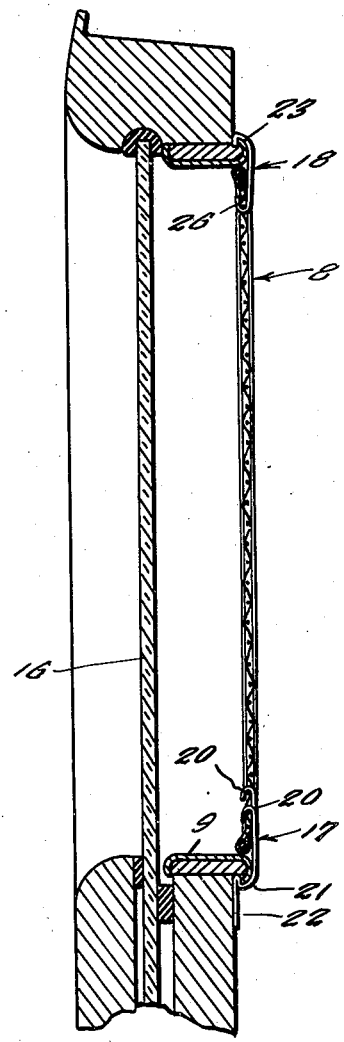
Figure 4 is a view similar to Figure 2 showing a modified style of attaching means for the flexible screen.
Figure 5:
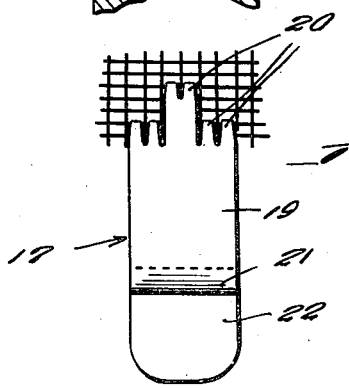
Figure 5 is an elevational view showing the latch-type clip disclosed at the bottom of the arrangement depicted in Figure 4.

As shown in Figure 4 the screen 8 is stretched properly across the molding in spaced relation to the window glass 16. In other words, instead of being within the confines of the window opening it is substantially flush with the inner marginal edge of the molding 9. In addition to the use of other clips (not shown) to maintain the marginal edges of the screen in place it is advisable to utilize retention clips of the type shown in Figures 5 and 6. The latch-type clip is differentiated by the numeral 17 and the hanger clip is denoted by the numeral 18. The shank portion 19 of the clip 17 is provided with a plurality of hooked fingers or claws 20 which are engaged in the strands of wire and clinched in place as is obvious to allow the clip to hang down and engage the projecting bead on the molding as shown at the bottom in Figure 4. The free end portion of the clip is fashioned to provide a keeper 21 which is engageable over the bead and the extremity is formed into a fingerpiece 22.

The clip 18 at the top is formed into a hanger hook 23 which engages over the adjacent part of the bead and the shank portion is split into complemental fingers 24 and 25 terminating in claws or grips 26 which engage in the wire as shown in Figure 7 to securely attach the clips to the screen wire. It is obvious, however, that the fastening clips will vary in construction to accommodate different types of window openings in which the flexible screen must be supported. The chief novelty, therefore, is in the provision of the flexibly bound screen self-accommodating and adapting and provided with detachable or permanently attached retaining clips, the clips being either fixedly attached to the screen at the time of manufacture or supplied to be attached by the user at the time of installation.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

What is claimed is:—

1. An automobile screen comprising a flexible screen and a marginal flexible frame, an attaching clip having a hook releasably engageable with a molding, the shang portion of the clip being provided with claw-equipped fingers interconnected with the intersecting wires forming the screen mesh.

2. An automobile screen comprising a flexible screen and a marginal flexible frame, an attaching clip having a hook releasably engageable with a molding, the shank portion of the clip being provided with claw-equipped fingers interconnected with the intersecting wires forming the screen mesh, and a second clip having a shank portion attached to the screen, said shank portion being formed with a latch-hook and a finger piece extending beyond said hook in the manner and for the purposes described.

3. As a new article of manufacture, a supporting and retention clip for an automobile screen of the class described comprising a single strip of resilient metal having one end bent to provide a hook for releasable connection with car door molding, the opposite end of said strip being provided with a pair of complemental diverging screen wire engaging fingers, said fingers being adapted to straddle the edge portion of the screen mesh and terminating at their free ends in claws bent in direction toward each other.

4. As a new article of manufacture, an automobile screen attaching and retaining clip comprising a single metal strip including a shank portion, one end of said shank portion being bent laterally to provide a hook to engage over car door molding, the opposite end of the shank being bifurcated to form a pair of substantially spaced parallel fingers with that portion between the fingers laterally struck out to provide an intervening third finger, said first-named fingers terminating in hooks bent in a direction to underlie the attaching hook, the terminal end of said third finger being bent to provide a hook directed toward and facing the hooks on said first-named fingers.

WILLIAM K. GRIEST.